W. Serviss,
Soldering Clamp.
Nº 80,673.    Patented Aug. 4, 1868.
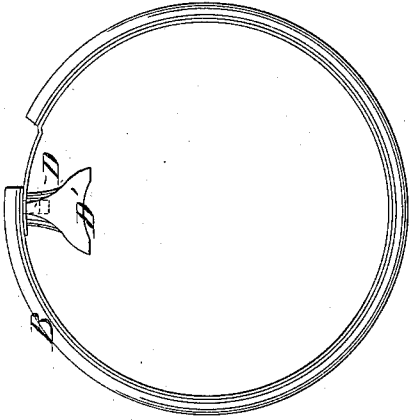
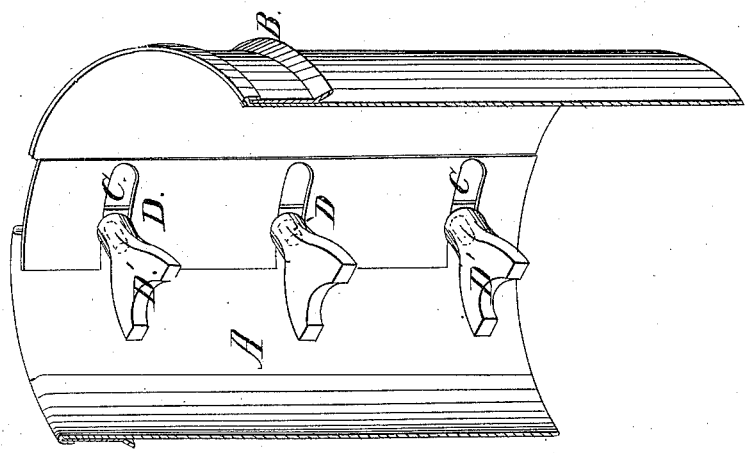
Witnesses:
Inventor:

United States Patent Office.

WILLIAM SERVISS, OF SIDNEY, OHIO.

Letters Patent No. 80,673, dated August 4, 1868.

---

IMPROVEMENT IN DEVICE FOR SOLDERING TIN CANS.

---

The Schedule referred to in these Letters Patent and making part of the same.

---

TO ALL WHOM IT MAY CONCERN:

Be it known that I, WILLIAM SERVISS, of Sidney, in the county of Shelby, and State of Ohio, have invented certain new and useful Improvements in Devices for Soldering Fruit-Cans; and I do hereby declare that the following is a full, clear, and exact description thereof, reference being had to the accompanying drawings, and to the letters of reference marked thereon, which form a part of this specification, in which—

Figure 1 represents a vertical section, in perspective, of my improved device for soldering tin cans, and Figure 2 a plan or top view of the same.

The object of my invention is to provide a convenient device whereby the operation of soldering tin cans, can-tops, or other cylindrical vessels, may be facilitated, and which shall be adjustable, to suit different diameters; and to this end my improvement consists in a tubular holder, having an annular lip near its top, against which the upper edge of the cylinder to be soldered rests, and capable of being sprung apart, to increase its diameter, being held in desired position by screws and nuts.

In manufacturing tin cans, for fruit or other purposes, tinners frequently experience the need of a device which will be adaptable to slight variations in diameter, without necessitating the use of a separate holder for each diameter of can made, and my improvement is designed to accomplish this end in a cheap and simple manner.

In the accompanying drawings, which show a convenient arrangement of parts for carrying out the objects of my invention, A represents a tubular holder, which is composed of sheet metal, bent into cylindrical form, and having its edges overlapping at their meeting-point, without being fastened together, the inner edge being countersunk or bent inwards for the distance that the outer overlaps it, so that the outside of the holder shall present a smooth surface for the reception of the cylinder to be soldered. An annular lip, B, is secured upon the holder, near its top, against which the upper end of the can rests during the operation.

Slots, C, are formed in the inner or countersunk edge of the sheet which composes the holder, through which screws D, on the overlapping edge, pass, and the two edges are clamped together by the nuts D'. The elasticity of the sheet metal will spring the edges apart when the nuts are slackened, thereby increasing the diameter of the holder, the nuts clamping the edges together when screwed up.

The sheet metal from which the can is to be formed is bent to cylindrical form, and placed around the holder, having its edges overlapping as far as necessary, and resting under and against the lip B. The can is then soldered in the usual manner, and withdrawn from the holder, which is held by means of its handle, E, which can be connected to a fixed clamp.

The device herein described is an improvement on that patented by me, March 24, 1868, differing therefrom in its adaptability to the soldering of cans of different diameters, the improvement consisting in providing the tubular holder with slots, screws, and nuts, substantially as above set forth.

What I claim as my invention, and desire to secure by Letters Patent, is—

The tubular holder A, when provided with the slots C, screws D, and nuts D', arranged and operating substantially as and for the purpose described.

In testimony that I claim the foregoing as my own, I affix my signature in presence of two witnesses.

WILLIAM SERVISS.

Witnesses:
H. C. ROBERTS,
H. W. NEAL.